May 10, 1927.

C. S. PRESTON 1,628,064

TIRE VALVE

Filed May 8, 1926

Clarence S. Preston
INVENTOR.

BY J W Sheeley

ATTORNEY.

Patented May 10, 1927.

1,628,064

UNITED STATES PATENT OFFICE.

CLARENCE S. PRESTON, OF SAN DIEGO, CALIFORNIA.

TIRE VALVE.

Application filed May 8, 1926. Serial No. 107,691.

The present invention relates to tire valves of the type set forth in my co-pending application, Serial No. 84788.

The invention has for its principal object the provision of a complete tire valve adapted to function in the same manner as the valve set forth in said co-pending application, with the provision of means for preventing any leakage from taking place during the period of inflation.

Another object of the invention is to provide a complete tire valve which may be positively set to prevent leakage during inflation, and which may also be set after inflation, to hold the air in the tire without depending upon the nonreturn valve.

Another object of the invention is to provide a removable valve, which not only carries out the above objects, but which may be applied to usual types of tire valve bodies.

Still another object of the invention is to provide a removable valve which may be applied to a valve body which is devoid of external threads, such as the valve body set forth in the Patent No. 1,570,397.

Still other objects and advantages of my invention will appear hereinafter.

I have illustrated my invention by the accompanying drawings, in which.

Figure 1:
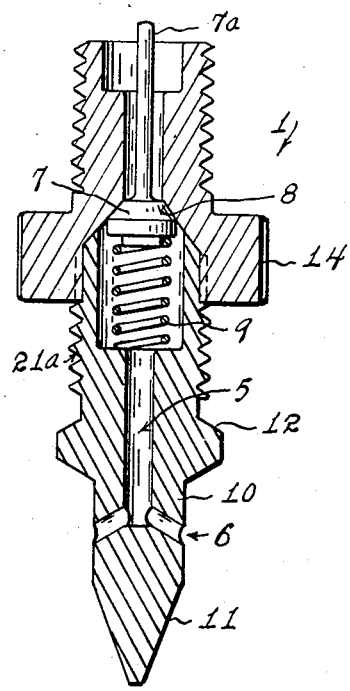
Figure 1 is an enlarged detail vertical section of the main part of a typical embodiment of my invention; said part being hereinafter known as the core.
Figure 2:
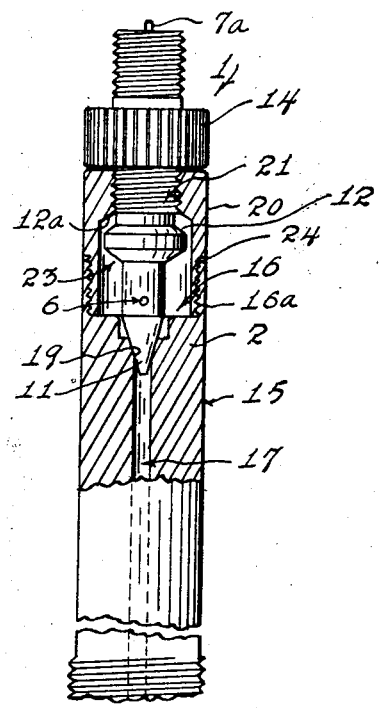
Figure 2 is a view in vertical section of a valve body or stem particularly adapted to receive the core shown in Fig. 1; this view showing the said core in place when in the act of inflating a tire.

In the embodiment shown in Figs. 1 and 2, there is provided the core 1, which is of elongated form and provided with a central bore 5, having laterally opening ports 6 adjacent the inner end of the bore. Said bore is provided internally with a seat 7 and a valve 8, adapted to contact with the seat to prevent outward flow of air. A spring 9 yieldably holds the valve seated but permits the valve to be depressed by inflowing air. Said seat, valve and spring comprises that which may be termed a nonreturn valve, as in the case of the valve set forth in the said co-pending application.

The core body is provided with an elongated lower portion 10 terminating at the inner end in a conical metal valve or core 11. Said portion terminates at the upper end in another conical surface 12. The core body is provided with an annuar enlargement or knurled nut 14.

The valve body or stem 2, shown particularly in Fig. 2, is provided with a smooth outer surface 15, devoid of threads. Adjacent the outer end of the valve body there is provided an enlarged internally threaded bore 16. From bore 16, a small air passage 17 leads inwardly to the interior of the inner tube (not shown) to which the valve body is applied. At the juncture of the bores 16 and 17, respectively, there is provided a suitable seat 19.

The conical lower end 11 of the core body is adapted to seat upon seat 19 to positively prevent escape of air outwardly through the air passage 17. In order to hold the core in proper relation to the valve body 2, I provide a casing 20, which has an internally threaded bore 21, in which the core body is screw threaded before the knurled nut is permanently secured to said core body. The knurled nut is caused to become a substantially integral part of the core, so that by turning the knurled nut the core body is turned and may accordingly be moved inwardly or outwardly of the casing 20 a limited distance.

The casing 20 is practically a removable extension to the valve stem or body 2, and is accordingly externally threaded at the inner end, as at 16ª, so that it may be screw threaded into the bore 16, of the valve body, as shown particularly in Fig. 2. The inner end of said casing is provided with an open bore 23, slightly larger than the elongated part of the core body, so that the core body may be turned without the corresponding turning of the casing 20. The bore 23 terminates in a seat 12ª on which the conical surface 12 of the core body 1 may seat.

In assembling the complete valve shown in Fig. 2, in the act of manufacturing same, the core body is screw threaded in the casing 20. The knurled nut is secured to the core body in such position that the core body may be moved relative to the casing, a slight distance in either direction. The externally threaded inner end of the casing 20 is then screw threaded into the tire valve body. Said casing should set quite tight in the valve body to prevent leakage, and a gasket 24 may be used between the casing and the valve body, as a further assurance against leakage at this point.

When the tire is inflated, the knurled nut is turned so that the core body is turned on its threads and is advanced in the casing until the inner conical end of the core seats on the seat 19. Thus air is held permanently in the tube and cannot escape outwardly through the air passage 17. The knurled nut in the core body is so positioned that it will not interfere with the seating action just described.

When it is desired to inflate the tire, the valve core must be unseated from seat 19. This is accomplished by turning the knurled nut in the proper direction to cause the valve core to ascend slightly in the threaded bore of the casing 20. Such turning is continued until the upper surface 12 strikes the seat 12ª on the casing 20. In this position the core body prevents escape of air along the threads of the valve core. While the bore of the core body and the air passage of the valve body are in communication, air cannot escape because of the nonreturn valve, which prevents outward escape of air. Thus, during inflation, leakage via the external threads of the core body is prevented, and escape of air from the passage 17 is prevented by the check valve.

When inflation is complete, the knurled nut is turned quickly so that the valve core descends in the casing until its lower end comes into air holding contact with seat 19. If at any time the valve core becomes defective, it may be replaced with a new one. This is done by removing the casing from the valve body, removing the valve core from the casing, fitting the casing with a new valve core and screw threading the casing into the valve body again.

Figure 3:
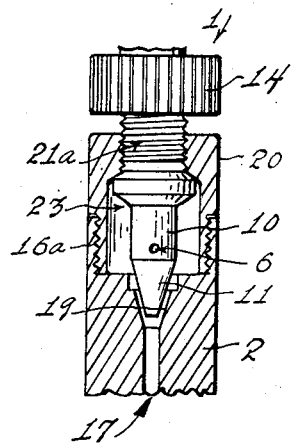
Figure 3 is a view in vertical section of a common type of tire valve body to which is applied a modified form of the core shown in Fig. 1.

In the form shown in Fig. 3, there is provided a core body 26, having upper and lower seating surfaces, respectively. Above the upper seating surface there is provided an air cap 20ª corresponding to the casing 20. Said cap loosely encompasses the core body and is internally threaded, as at 27, for attachment to a standard tire valve body 28. The core is externally threaded, as at 29, to screw into the said standard valve body when the parts are assembled, as shown. Inflation is accomplished by turning the valve core until the upper seating surface abuts the cap 20ª to prevent outward escape of air.

It will be apparent now that I have provided an improved tire valve movable to prevent escape of air by any threaded portion during inflation, and also movable to hold the air after inflation without the aid of a nonreturn valve or the like, and while I have shown and described a specific embodiment of my invention, I do not limit myself to any specific construction or arrangement of parts, and I may alter same as I desire, or as occasion requires, without enlarging the scope of my invention as set forth in the appended claim.

I claim:—

In an attachment for tire valve bodies, a two piece elongated core body member providing an internal valve receiving space, a non-return valve in said space, and intermediate externally threaded portion to said core body surrounding said space, a head above said externally threaded portion, an integral annular enlargement to said core body below said externally threaded portion; said body provided with an air course continuing downwardly from said valve space and opening outwardly of the core body below said annular enlargement; and further provided with an outer seating end beyond the opening of said air course; said core body being composed of two pieces nonrevolubly joined to each other intermediate of said head and said intermediate externally threaded portion, respectively, and a cap-like casing having an open lower end providing a downwardly opening cavity, an upper closure wall to said cap provided with an internally threaded bore of smaller diameter than said cavity; said cap-like casing fitted to said core body by inter-engagement of the threads of the externally threaded portion of the core body with the threads of the internally threaded bore of the cap-like casing; the lower portion of said core body extending outwardly through the open end of the cap-like casing with said annular enlargement disposed in said cavity; said annular enlargement to said core body and the said closure wall of said casing providing corresponding seating surfaces for the purpose set forth; said cap-like casing provided with means for attachment to a tire valve body.

CLARENCE S. PRESTON.